United States Patent
Moll

[11] Patent Number: 6,068,945
[45] Date of Patent: May 30, 2000

[54] BATTERY

[75] Inventor: Peter J. Moll, Staffelstein, Germany

[73] Assignee: Akkumulatorenfabrick Moll GmbH & Co. KG, Staffelstein, Germany

[21] Appl. No.: 08/937,675

[22] Filed: Sep. 25, 1997

[30] Foreign Application Priority Data

Sep. 26, 1996 [DE] Germany ............... 296 16 824 U
Dec. 5, 1996 [DE] Germany ............... 296 21 148 U
Apr. 1, 1997 [DE] Germany ............... 297 05 725 U

[51] Int. Cl.[7] .................................................. H01M 2/12
[52] U.S. Cl. ........................... 429/89; 429/53; 429/57; 429/86
[58] Field of Search ................... 429/53, 57, 89, 429/86, 82

[56] References Cited

U.S. PATENT DOCUMENTS

| | | | |
|---|---|---|---|
| 3,860,453 | 1/1975 | Schmidt | 136/177 |
| 4,052,534 | 10/1977 | Devitt | 429/86 |
| 4,168,350 | 9/1979 | Oxenreider et al. | 429/87 |
| 4,294,895 | 10/1981 | Atkins | 429/84 |
| 4,315,058 | 2/1982 | Schwendener et al. | 429/84 |
| 4,400,450 | 8/1983 | Wagner | 429/86 |
| 4,678,726 | 7/1987 | Buder et al. | 429/88 |
| 5,209,992 | 5/1993 | Feres | 429/86 |
| 5,298,344 | 3/1994 | Stocchiero | 429/53 |
| 5,663,010 | 9/1997 | Stocchiero | 429/86 |

Primary Examiner—Mark Nuzzolillo
Assistant Examiner—Tracy Dove
Attorney, Agent, or Firm—Dilworth & Barrese

[57] ABSTRACT

A battery has a battery case, a cover (1), cells located in the case and at least one opening (2) for venting of the gases occurring in the cells, into which a flashback protection frit (3) is inserted. To improve such a battery, a baffle wall (12) is placed in of the flashback protection frit (3) (FIG. 3).

22 Claims, 5 Drawing Sheets

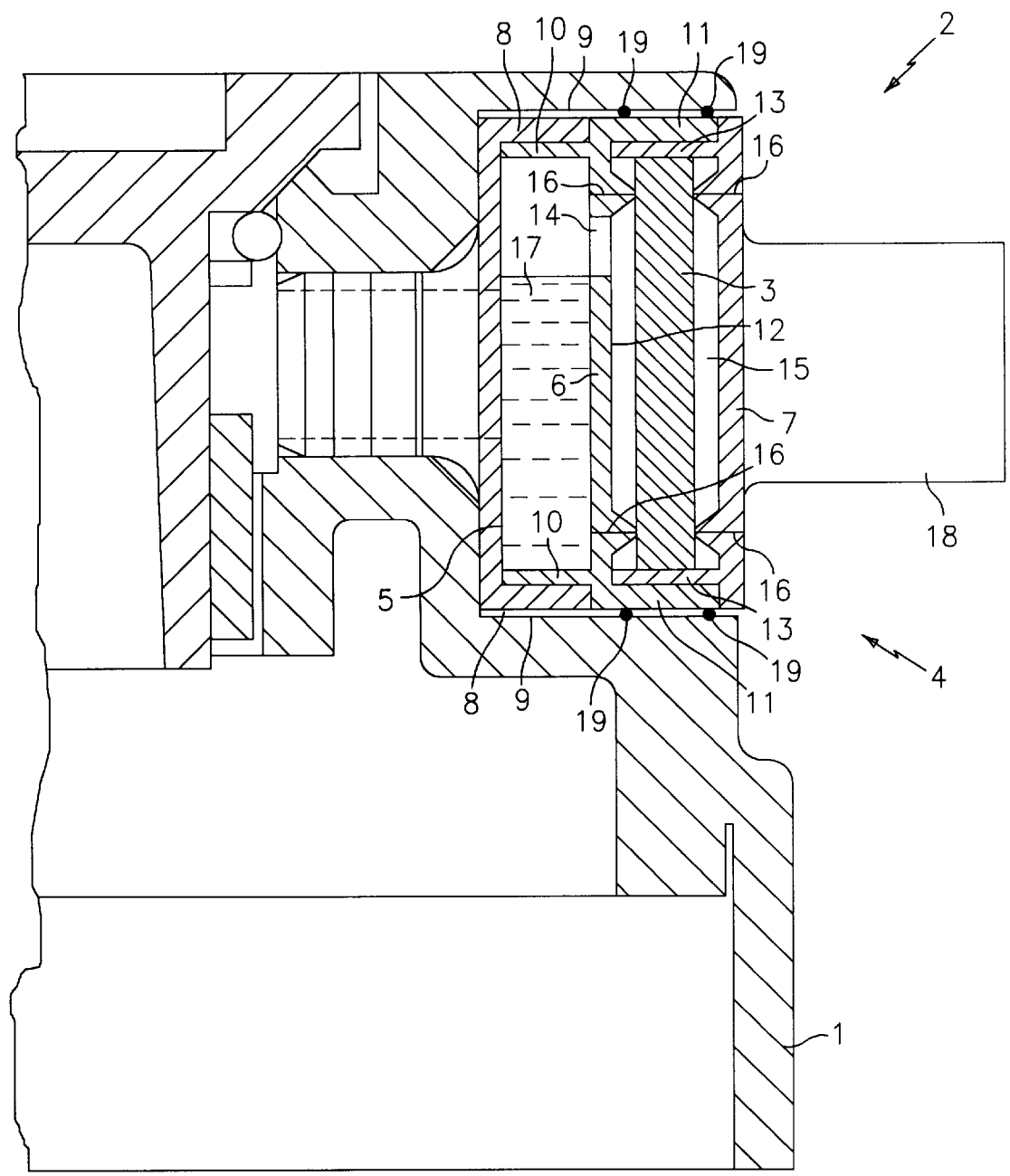
FIG. 3/1

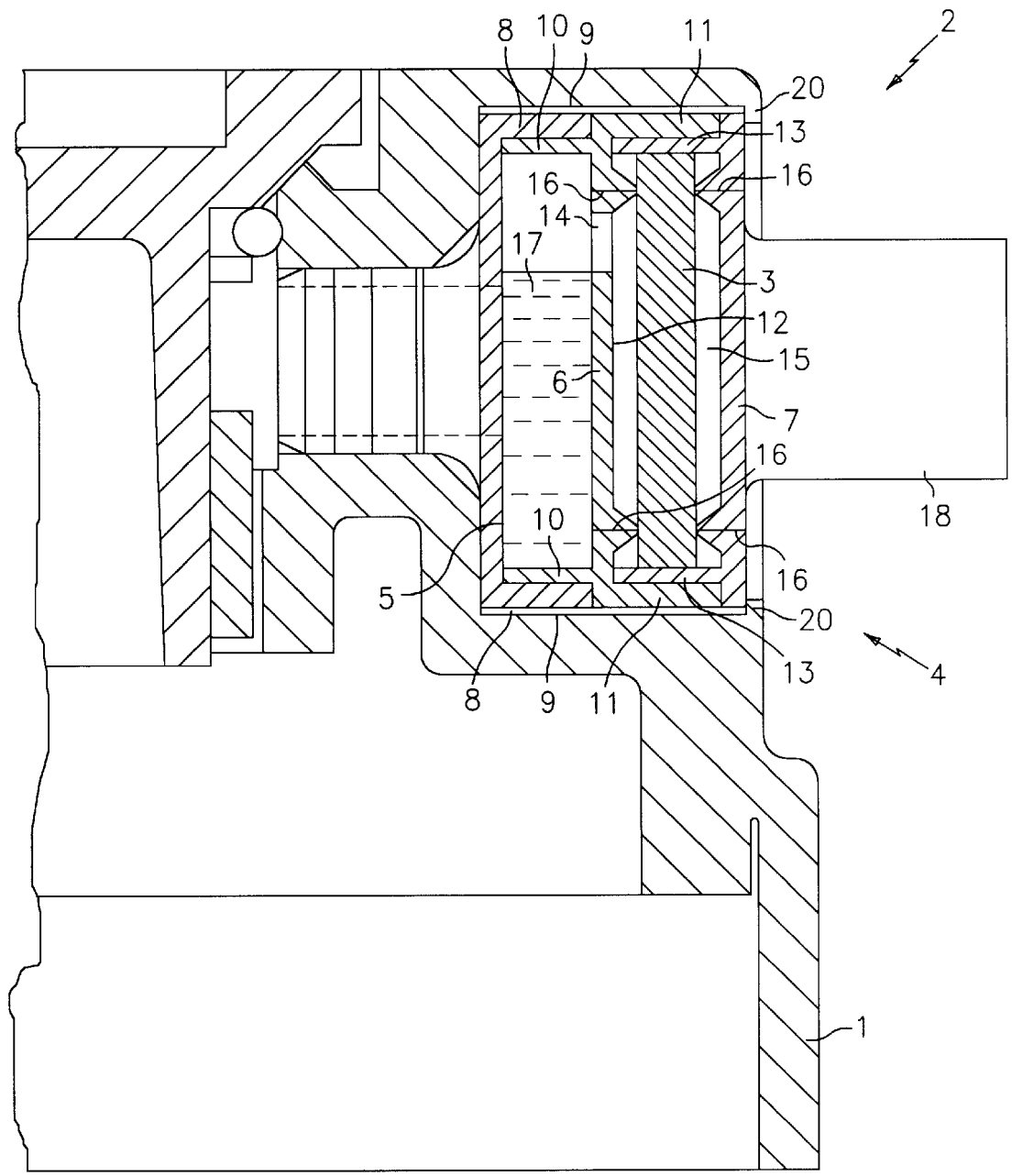
FIG. 3/2

BATTERY

BACKGROUND OF THE INVENTION

This invention concerns a battery with a battery case, a cover, cells located in the case and at least one opening for venting of the gases exiting from the cells, into which a flashback protection frit is inserted that serves to prevent explosive ignition of the gases exiting from the battery case resulting from sparking.

Such a battery is known from DE-GM 90 15 535. The battery is a multi-cell battery, preferably a starter battery. The battery is also known from DE-OS 34 44 -11 as the so-called Kamina battery. It has a channel to vent the gases, generally containing oxygen, exiting from the cells.

The flashback protection frit, known from DE-GM 90 15 535, is inserted tight to the edge in an expanded opening like a blind pocket at the edge of the battery cover and is therefore protected against damage. It can also be easily installed and replaced if necessary. A tight fit in the battery top is achieved by side locks; resistance is encountered when attempting to disassemble it.

During operation of the battery previously known from DE-GM 90 15 535, acid droplets that may also contain solid particles that can be transported by the gases strike the flashback protection frit, with possible resultant loss of efficiency.

SUMMARY OF THE INVENTION

The object of the invention is to improve upon the protection from the flashback protection frit in a battery of the type mentioned at the beginning.

Pursuant to the invention, this object is solved in that a baffle wall is placed in front of the flashback protection frit. The gas flow from the battery, with any acid droplets carried therewith, first encounters this baffle wall. If any acid droplets are present, they can be separated out on this baffle wall. The gas flow, "separated" from the acid droplets and particles, then passes through the flashback protection frit. It can be vented from there into the "open air". This can be handled as described in DE-GM 90 15 535 with or without plug-in elbows and tubes. In batteries that operate without additional gas venting (elbows and tube), the exit support can be omitted and replaced by a perforated plate with one or more gas opening(s). It is then vented either into the atmosphere or into the engine compartment of the motor vehicle in which the battery is located.

Advantageous developments are described in the following.

It is advantageous for there to be a fore-chamber in front of the baffle wall. The fore-chamber can be used to collect the acids separated out.

The flashback protection frit can be arranged in a filter chamber.

The fore-chamber and/or the filter chamber can be formed from a flashback protection housing.

The baffle wall preferably has one or more opening(s). The gases pass through these openings into the flashback protection frit and/or the filter chamber.

It is advantageous for the opening(s) to be located in the upper portion of the baffle wall. If a fore-chamber is placed in front of the baffle wall, the collection space available for the acids is all the larger.

A further advantageous development is characterized in that the lower limits of the openings lie in a horizontal line. If a fore-chamber is located in front of the baffle wall, the collection space made available by this can be optimally used for the acid droplets.

Preferably, the flashback protection frit and/or the flashback protection housing is mounted in the opening. A side lock is also provided for the flashback protection frit and/or the flashback protection housing, providing positional security and security against its falling out. The flashback protection frit and/or the flashback protection housing is mounted in the opening and presents resistance to being removed.

The mounting can be achieved by gluing the flashback protection housing to the cover. A further advantageous development is characterized in that the flashback protection housing is locked to the cover. This can be done with a rim on the housing and a corresponding groove on the cover. It is also possible to provide several rims, preferably 2, that will enter into the corresponding number of grooves on the cover. In addition to gluing and interlocking, other types of connection are also possible.

Instead of this or in addition thereto, the mounting can be handled by providing an undercut in the cover, attaching to the flashback protection frit and/or the flashback protection housing. The undercut can also be executed as a projection on the cover that leads to a latching when the flashback protection frit and/or the flashback protection housing is pressed down. The flashback protection frit and/or the flashback protection housing is then mounted and resistance will be encountered when attempting to remove it.

Pursuant to another advantageous development, spacers are provided that are conical in shape and that hold the flashback protection frit in place. Preferably, these spacers are located on the outside of the baffle wall and/or the inside of the outer portion of the flashback protection housing. The tips of the spacers form a gas-tight seal. The flow of gas around the flashback protection frit can be prevented thereby, without additional seals.

According to another advantageous development, a cap, preferably rubber, is placed in front of the baffle wall. The cap and/or rubber cap is preferably placed on a bush. The bush can be connected to the fore-chamber portion.

BRIEF DESCRIPTION OF THE DRAWINGS

Methods of embodiment of the invention are explained in detail below, based on the drawings. The drawings show:

FIG. 3/1 an altered method of embodiment, in which the flashback protection housing is connected with the cover by gluing and/or interlocking, FIG. 3/2 a further altered method, in which the flashback protection housing is mounted with an undercut in the cover and FIG. 4 a further alteration, with a bush and a rubber cap.

DESCRIPTION OF THE PREFERRED EMBODIMENTS

Figure 1:
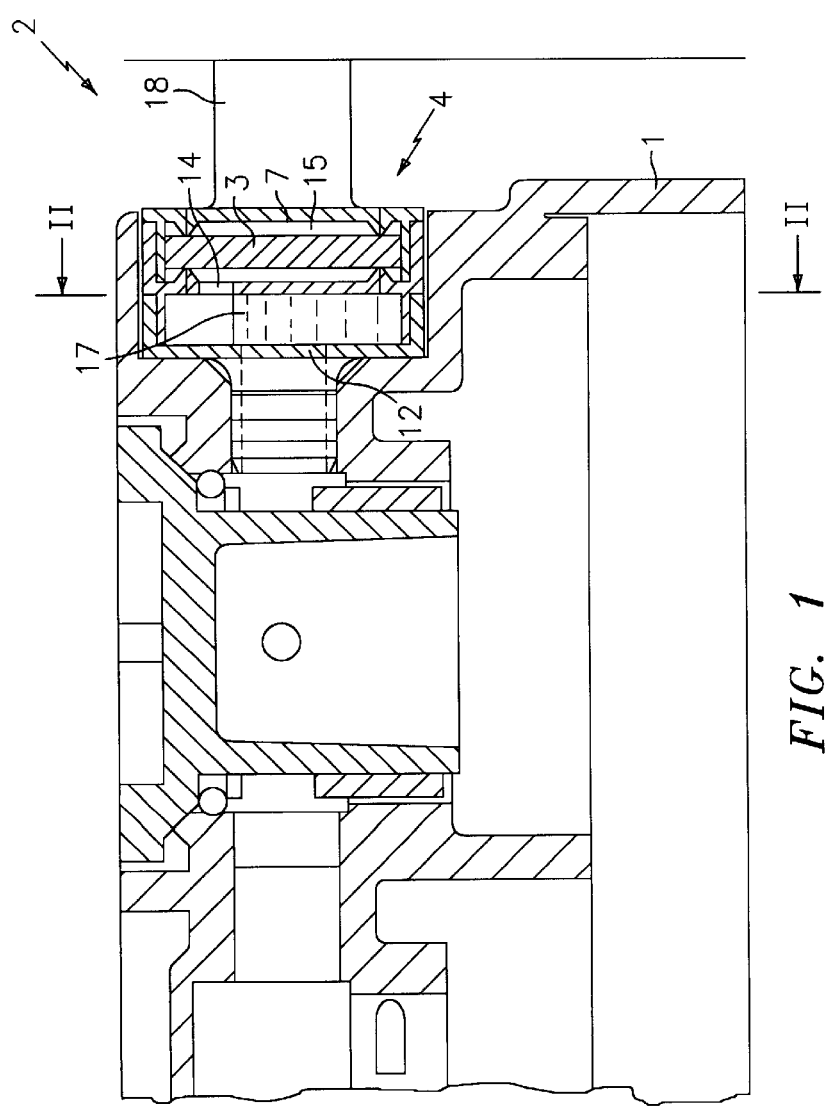
FIG. 1 a part of a starter battery in a longitudinal cross-section.
Figure 3:
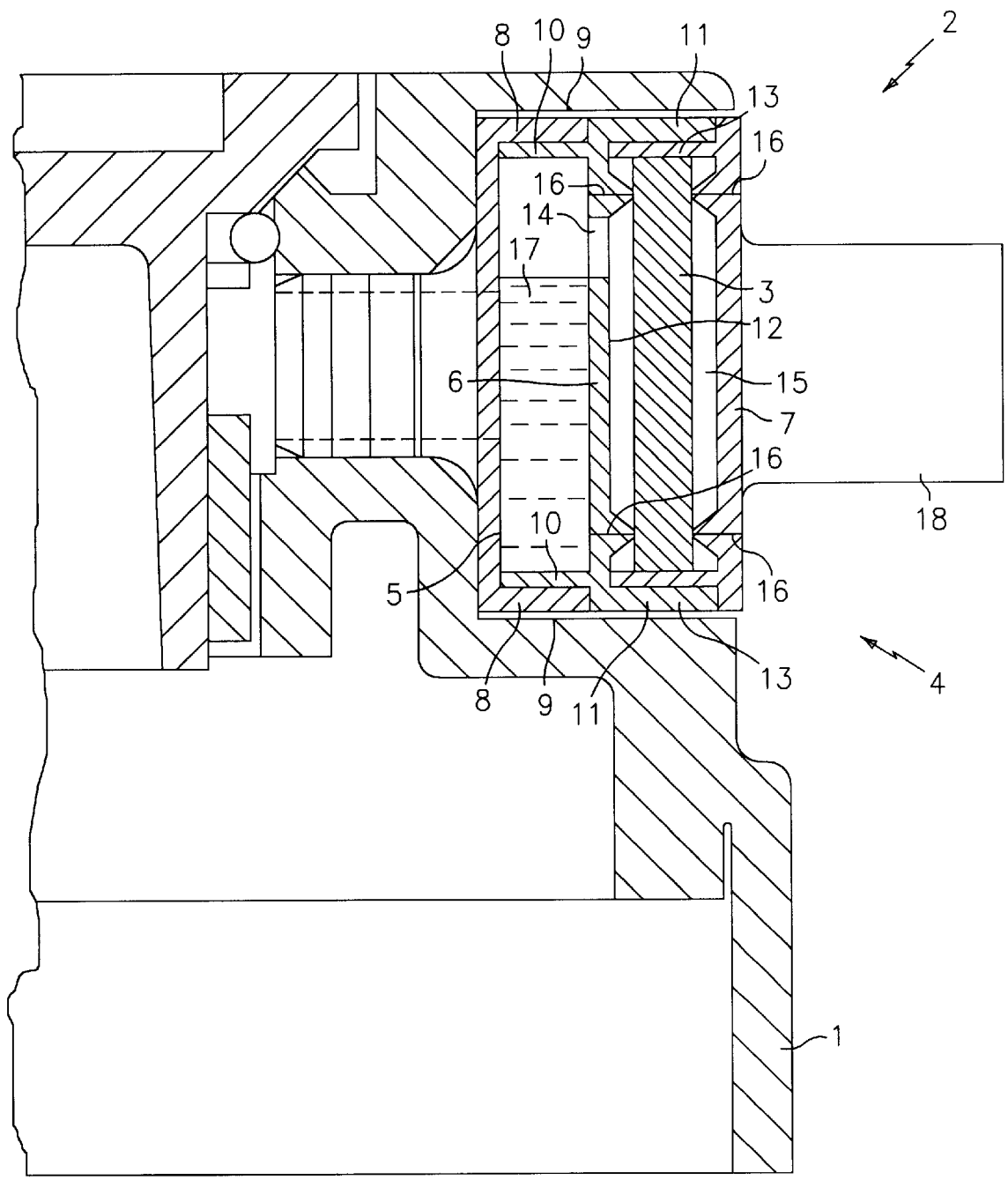
FIG. 3 an enlarged section from FIG. 1.

In FIGS. 1 and 3, cover 1 of a battery is shown that has opening 2 for venting gases from the cells of the battery. Flashback protection frit 3 is inserted into opening 2. Opening 2 is expanded as a blind pocket in the manner known from DE-GM 90 15 535.

Flashback protection frit 3 is located in flashback protection housing 4, which, in turn, consists of fore-chamber part 5, buffer wall part 6 and outside part 7, that are connected together, preferably welded, preferably welded by ultrasound or heat-welded. The pot-shaped fore-chamber part has rim 8 that is provided inside the blind-pocket-like expansion 9 of opening 2. Inner rim 10 of buffer wall part 6 is inserted into rim 8. Outer rim 11 of buffer wall part 6 has essentially the same dimensions as rim 8 of fore-chamber part 5 and runs from it toward the outside. The inside end of rim 11 rests on the outer end of rim 8. Rims 10 and 11 are connected together essentially by the flat buffer wall or baffle plate 12.

Rim 13 of pot-shaped outer part 7 is inserted into outer rim 11 of buffer wall part 6.

The gas flowing from the battery strikes baffle plate 12 so that acid droplets contained in the gas flow are separated out. The gas flow thus separated and freed of acid droplets then passes over the ventilation holes provided in baffle plate 12 and/or openings 14 in filter chamber 15, formed between baffle plate 12 and outer part 7, and located in flashback protection frit 3. To hold flashback protection frit 3 in the location shown in the drawing, spacers 16 are provided in the outside of baffle wall 12 and the inside of outer part 7, which spacers are conical in shape. With this conical shape, a tip seal is formed with flashback protection frit 3 during the welding process, taking place under pressure, of parts 5, 6 and 7. This seal prevents any gas flow around the flashback protection frit, without additional sealing. The acid droplets separated at baffle wall 12 collect in fore-chamber 17 formed between fore-chamber part 5 and baffle wall part 5. Venting occurs via filter chamber 15 over exit supports 18 or a perforated plate (not shown in the drawing) with one or gas opening(s), into the open air or the engine compartment.

Figure 2:
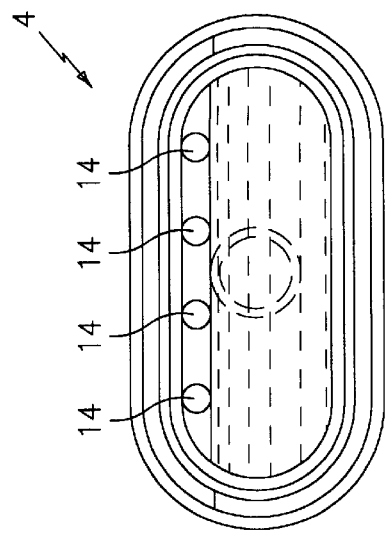
FIG. 2 a section along Line II—II in FIG. 1.

It can be seen from FIG. 2 that there are a total of four openings 14 located in the upper area of baffle wall 12 and the lower limits of which lie in a horizontal line, forming the highest possible "acid level".

In the altered methods of embodiment, shown in FIGS. 3/1 and 3/2, the parts corresponding to those in Drawing FIGS. 1 through 3 bear the same reference numbers so that these part need not be described again.

In the variant pursuant to FIG. 3/1, flashback protection housing 4 is interlocked in opening 2 of cover 1. This interlocking is handled through two rims 19 provided on the outside circumference of outer edge 11 of baffle wall part 6 of flashback protection housing 4, which rims penetrate into two corresponding grooves on the inside of opening 2 of cover 1. Rims 19 and the grooves are matched to each other in terms of height, depth and other formation characteristics such that flashback protection housing 4 is mounted reliably and after installation, can be disassembled only with a tool. With the method of embodiment described, flashback protection housing 4 is anchored in opening 2 by a rim mount, in which outer rim 11 of baffle wall part 6 is anchored with the inner wall of opening 2 through a counter-rim shape or a groove and a firm connection is thus created. Flashback protection housing 4 is interlocked with cover 1 through the application of a rim on the outside with the corresponding counter-rim formation or groove in cover 11. The mounting is achieved through a form-fitting rim interlock, i.e., by application of one or more rims to the outside of the flashback protection housing that locks into corresponding shaped recess grooves or channels in the blind-pocket-like recess in the cover.

Instead of the interlock connection, flashback protection housing 4 can be mounted in opening 2 through gluing, for example, at the locations marked with reference number 19 in FIG. 3/1.

In the altered method of embodiment shown in FIG. 3/2, undercut 20 is provided in cover 1 for mounting flashback housing 4. Undercut 20 is designed as a protection narrowing the cross-section of opening 2. Flashback protection housing 4 is located in the position shown in FIG. 3/2 in the interlocked position. Undercut 20 is designed and dimensioned such that, upon installation, it permits introduction of flashback protection housing 4 so that removal of flashback protection housing 4 is blocked or prevented. The axial distance of undercut 20 from the base of opening 2 is dimensioned such that flashback housing 4 sits firmly in the axial direction. Undercut 20 thus lies on the outer edge of outside part 7.

Figure 4:
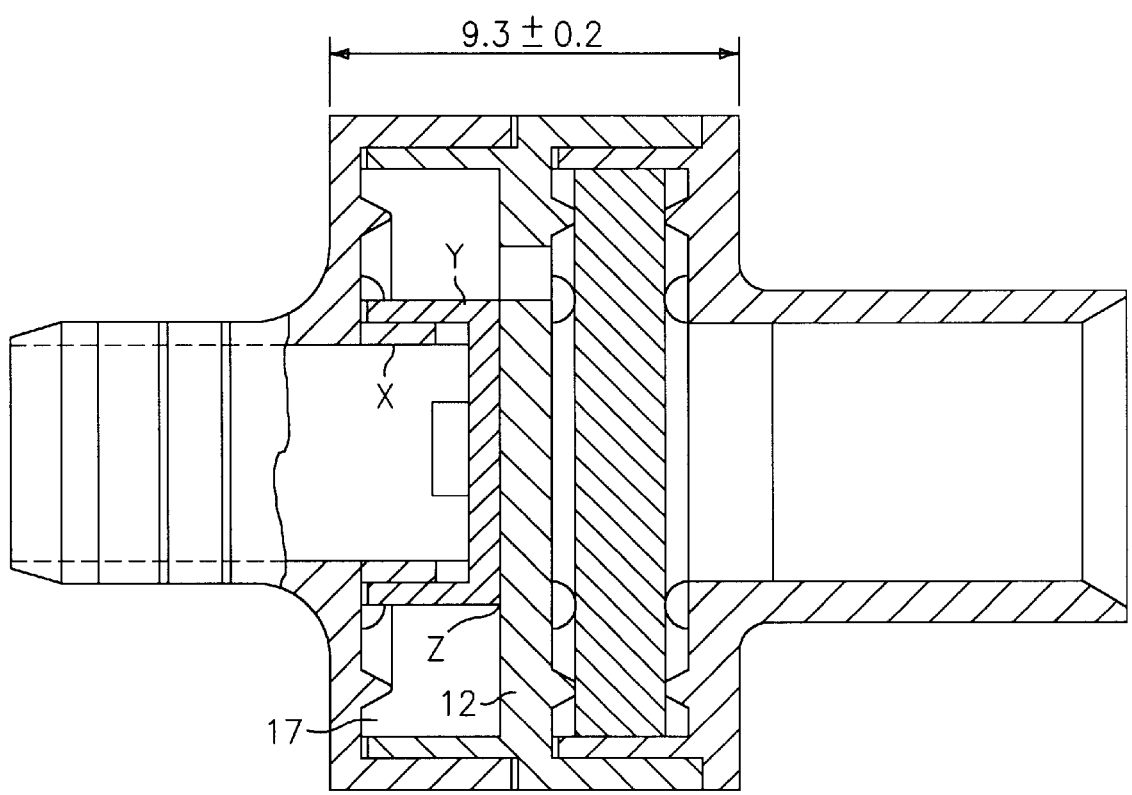

FIG. 4 shows an additional altered method of embodiment, in which, unlike the methods of embodiment already described, fore-chamber 5 is provided with bush X that runs coaxially with the longitudinal axis of flashback protection housing 4 and onto which rubber cap Y is slipped. Rubber cap Y has a cylindrical sheath with which it is slipped onto bush X turned toward baffle wall 12. Fore-chamber part 5, bush X and rubber cap Y are dimensioned such that a small gap Z remains between the floor of rubber cap Y and baffle wall 12. Furthermore, there is a press-fitting between bush X and the sheathing part of rubber cap Y. These two parts are fitted to each other such that rubber cap Y, after mounting, can no longer move from bush X, but rather is held reliably fast by the above-mentioned press-fitting.

Rubber cap Y works as a valve in operation. Gases arising and fluids emerging during operation of the battery, that escape through the central vent in the battery cover, are "automatically braked" upon impacting the rubber cap or its floor. If pressure increases further, rubber cap Y is thrust toward baffle wall 12. If pressure increases still further, the floor portion of rubber cap Y lies against baffle wall 12. If the pressure continues to rise, the gases and fluids are pressed between bush X and the sheathing portion of rubber cap Y by the passage pressure. They must then overcome this passage pressure (tension of rubber cap over the bush) and the closing pressure determined by the material of the rubber cap and can then enter fore-chamber 17.

The floor part of rubber cap Y thus works as a baffle wall. It is first mounted by the press-fitting between bush X and rubber cap Y and held against baffle wall by the rising pressure.

The technical solution according to FIG. 4 with valve rubber cap Y and following flashback protection frit 3 for avoidance of flashbacks from outside can be used in normal lead-acid batteries with liquid electrolytes, and also in batteries with solid electrodes (both gelled technology as well as mat technology) that belong to the gas-tight sealed battery group. These batteries are known internationally as VRLA (Valve-Regulated Lead Acid) batteries. These are completely maintenance-free batteries that replace the recombination known as the oxygen cycle to avoid electrolyte loss, which, according to the method of embodiment in FIG. 4, allows only a limited (internal) pressure during over-pressure operation and, on the other, allows no gases to enter

What is claimed is:

1. A battery comprising a battery case, a cover (1), cells located in the case, at least one opening (2) for venting of the gasses occurring in the cells, a flashback protection housing (4) is inserted into said at least one opening (2), said flashback protection (4) comprising a housing part (7), a flashback protection frit (3) located in front of housing part (7), a baffle wall (12) located in front of the flashback protection frit (3), a fore-chamber part (5) located in front of the baffle wall (12), and the fore-chamber part (5), baffle wall (12), and housing part (7) being connected together to form said flashback protection housing (4), wherein the battery additionally comprises an undercut (20) provided in the cover (1) for mounting of the flashback housing (4), with the undercut (20) being formed as a protection narrowing cross-section of the opening (2) such that the flashback protection housing (4) can be interlocked with the undercut (20) upon installation, such that removal of the flashback protection housing (4) is blocked or prevented.

2. A battery pursuant to claim 1, additionally comprising a filter chamber (15) defined between said baffle wall (12) and housing part (7) within said housing (4), in which the flashback protection frit(3) is arranged.

3. A battery pursuant to claim 1 wherein the baffle wall (12) has one or more openings (14).

4. A battery pursuant to claim 3, wherein the opening(s) (14) are located in the upper area of the baffle wall (12).

5. A battery pursuant to claim 3, wherein the lower limits of the openings (14) lie in a horizontal line.

6. A battery pursuant to claim 1, wherein the flashback protection housing (4) is glued to the cover (1).

7. A battery pursuant to claim 1, additionally comprising an undercut (20) provided in the cover (1) for mounting of the flashback protection housing (4).

8. A battery pursuant to claim 1, additionally comprising spacers (16) which are conical in shape and are provided on an interior of said housing part (7) to extend toward the baffle wall (12) and on an interior of said baffle wall (12) to extend towards said housing part (7) to hold the flashback protection frit (3) in place.

9. A battery pursuant to claim 1, additionally comprising a cap provided in front of the baffle wall (12), and arranged to act as a valve.

10. A battery pursuant to claim 9, additionally comprising a bush (X) to which the cap slips on.

11. A battery pursuant to claim 1, wherein the flashback protection housing (4) is interlocked with the cover (1).

12. A battery pursuant to claim 11, additionally comprising a rim (19) provided on the housing (4) and a corresponding groove on the cover (1) by which the flashback protective housing (14) is interlocked with the cover (1).

13. A battery pursuant to claim 9, wherein the cap is a rubber cap (Y).

14. A battery pursuant to claim 1, wherein the flashback protection housing (4) is anchored in the opening (2) by a rim mount, wherein an outer rim (11) of the baffle wall (12) is anchored within an inner wall of the opening (2) through a counter-rim formation or a groove in the cover (1), to establish a firm connection.

15. A battery pursuant to claim 1, wherein the undercut (20) is formed to lie on an edge of the housing part (7) of the flashback protection housing (4).

16. A battery pursuant to claim 14, wherein an external side of the housing part (7) of the flashback protection housing (4) is substantially flush with a corresponding outer surface of the battery cover (1).

17. A battery pursuant to claim 1, wherein said baffle wall (12) comprises inner (10) and outer (11) rims extending in opposite directions to one another, said fore-chamber part (5) comprises two rims (8) arranged such that the inner rims (10) of the baffle wall (12) rest on respective rims (8) of the fore-chamber part (5).

18. A battery pursuant to claim 17, wherein said outer rims (11) of said baffle wall (12) and rims (8) of said fore-chamber part (5) have substantially the same dimensions.

19. A battery pursuant to claim 17, wherein said housing part (7) additionally comprises rims (13) arranged to be inserted between and rest upon said outer rims (11) of said baffle wall (12).

20. A battery pursuant to claim 18, wherein said housing part (7) additionally comprises rims (13) arranged to be inserted between and rest upon said outer rims (11) of said baffle wall (12).

21. A Battery pursuant to claim 20, wherein said rims (13) of said housing part (7) support said frit (3).

22. A Battery pursuant to claim 19, wherein said rims (13) of said housing part (7) support said frit (3).

\* \* \* \* \*